A. DESBAINS.
MEASURING DEVICE.
APPLICATION FILED JULY 1, 1919.
1,411,911. Patented Apr. 4, 1922.
3 SHEETS—SHEET 1.
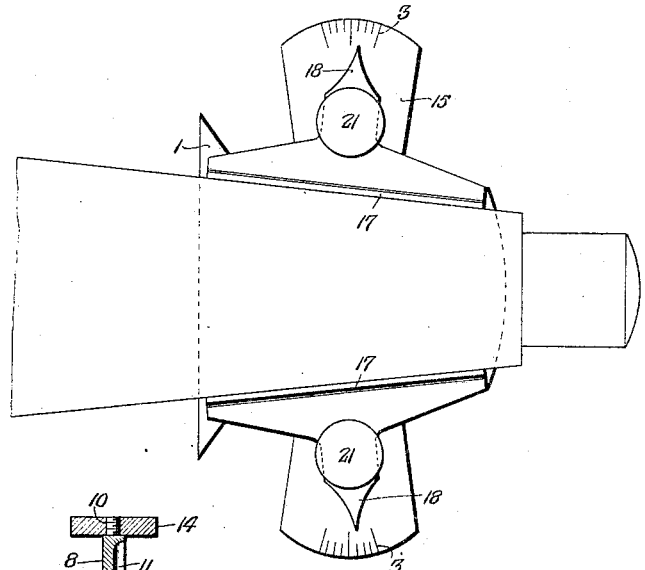
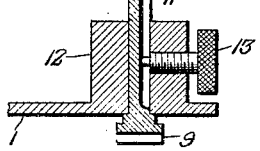
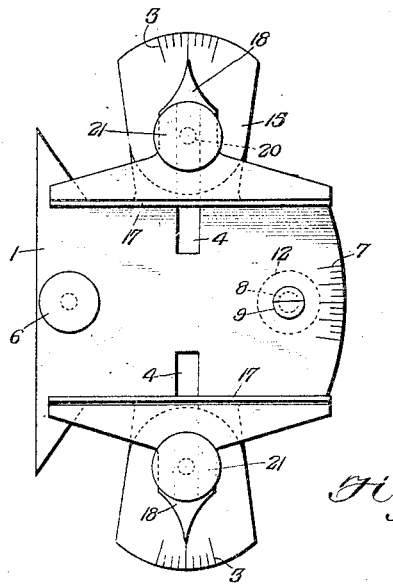
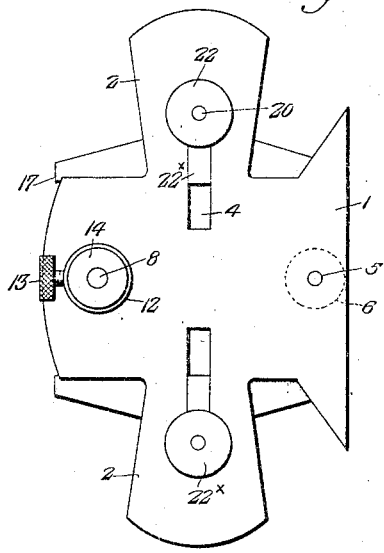
Witnesses
J H Crawford
T. E. Turpin
Inventor
Antoine Desbaines,
By Victor J. Evans
Attorney

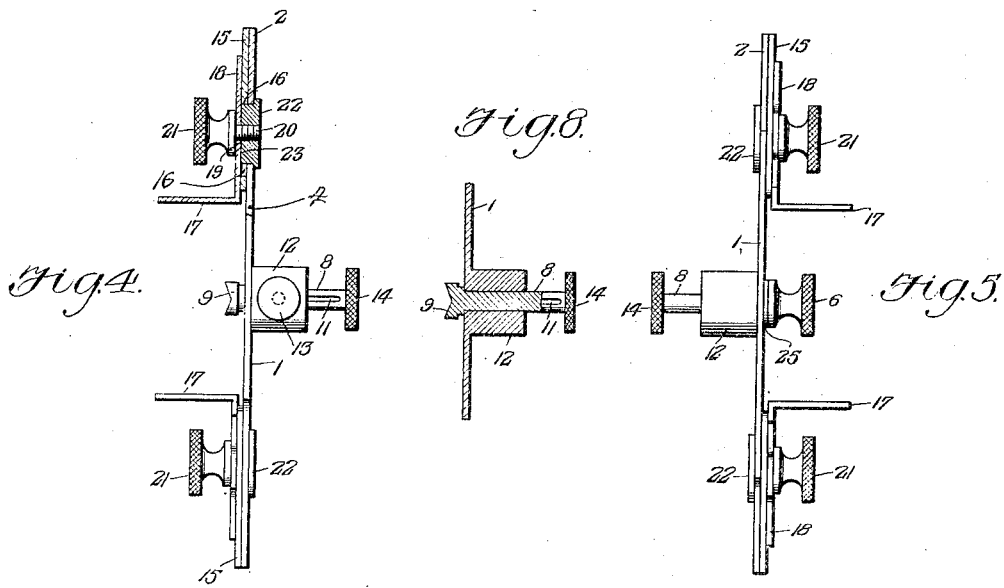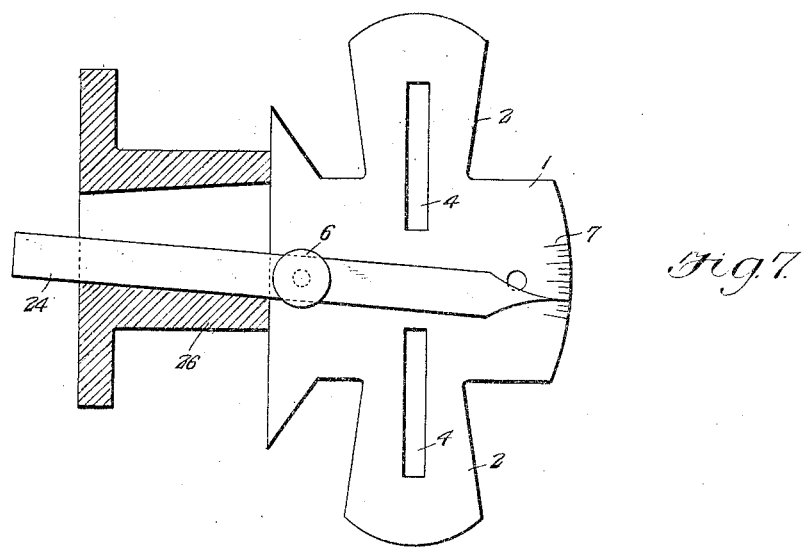

Inventor
Antoine Desbains,

By Victor J. Evans
Attorney

Witnesses

UNITED STATES PATENT OFFICE.

ANTOINE DESBAINS, OF MONTREAL, QUEBEC, CANADA.

MEASURING DEVICE.

1,411,911.  Specification of Letters Patent.  Patented Apr. 4, 1922.

Application filed July 1, 1919. Serial No. 307,907.

*To all whom it may concern:*

Be it known that I, ANTOINE DESBAINS, a subject of the King of Great Britain, residing at Montreal, in the Province of Quebec and Dominion of Canada, have invented new and useful Improvements in Measuring Devices, of which the following is a specification.

My present invention pertains to measuring devices; and it has for its object to provide a device that is highly advantageous, particularly in the repair work of lathe hands, for measuring the angles of conical shafts and similar bores, inasmuch as when accurately made the device is calculated to indicate immediately the correct angle and thereby save considerable time.

The invention in all of its details will be fully understood from the following description and claims when the same are read in connection with the accompanying drawings, hereby made a part hereof, in which:

Figure 1 is a view illustrative of the use of my novel device in connection with a tapered shaft.

Figure 2 is a side elevation of the device per se.

Figure 3 is an elevation of the opposite side of the device.

Figures 4 and 5 are elevations showing the opposite ends of the device.

Figure 6 is a transverse section showing the mounting of the endwise movable transverse bolt.

Figure 7 is a view showing the application of the device for measuring the angle of a bore.

Figure 8 is a transverse section of the device, which section is hereinafter explicitly referred to. This section is at right angles to that of Figure 6.

Similar numerals designate corresponding parts in Figures 1 to 8 to which reference will first be had.

Figure 9:
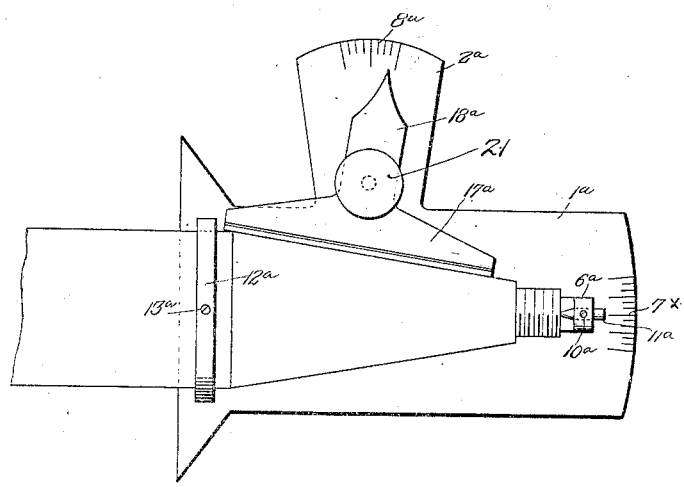
Figures 9, 10 and 11 are views of a modification.

As will be readily noted, by particular reference to Figures 2 to 6, my novel device includes, among other elements, a body plate 1. The said plate 1 is provided with opposite wings 2, in which are aligned slots 4, the inner portions of said slots extending into the major portion of the plate, as illustrated. Adjacent to one end the major portion of the body plate 1 is provided with a transverse threaded aperture 5, Fig. 3, to receive the threaded shank of a headed screw 6. At its opposite end the said major portion of the plate 1 is provided with a graduated scale 7, and located adjacent to the last-named scale 7 is an endwise movable bolt 8, that is disposed through the body plate. Said bolt 8 is headed at 9 and reduced and threaded at its opposite end as indicated by 10, Fig. 6, and is provided with a longitudinal groove 11. Its shank extends through the plate and through a sleeve 12 at the back of the plate, and it is designed to be adjustably fixed in position by a set screw 13 that bears in the said sleeve 12 and has its inner end adapted to enter the groove 11. A nut 14 is removably arranged on the threaded end 10 of the bolt shank, and hence it will be manifest when said nut 14 is removed and the screw 13 is turned outwardly in its bearing, the bolt may be removed and may as readily be replaced. Located flatwise on and adjustable relatively to the wings 2 are plates 15 that are adjustable on the body plate 1 and are equipped with scales 3 and slots 16, Fig. 4. At 17 are jaws having pointers 18 at right angles to their major portions and adapted to cooperate with the scales 3. In the said pointers are apertures 19, and extending through the slots 4 in the wings 2 and through the slots 16 in the plates 15, as well as through the pointers 18 are the threaded shanks 20 of headed screws 21; the said shanks being received in nuts 22, which are disposed back of the body plate 1 and are provided with rectangular portions 22×, Fig. 3, that are disposed and slidable in the slots 4 of the wings 2 and in the slots 16 of the plates 15.

The manner of using my novel device to measure the angle of a conical shaft is clearly shown in Figure 1, and by reference to the said figure and in the light of the foregoing description, it will be manifest that when the two pointers are on the same degree of the scales 3, the angle will be accurately indicated.

At 24 in Fig. 7 is a lever pointer that is adapted to be pivotally mounted on the shank of the screw 6 and alongside a washer 25, Fig. 5, and to be used in conjunction with the scale 7, Figure 7, for the purpose of measuring the angle of a bore in a member 26, to which the body plate 1 is opposed squarely as clearly shown in Fig. 7.

As will be observed by reference to Figure 8, the head 9 of the endwise movable bolt 8 is provided with a V-shaped face, desirable for centering the device about a shaft.

Figure 10:
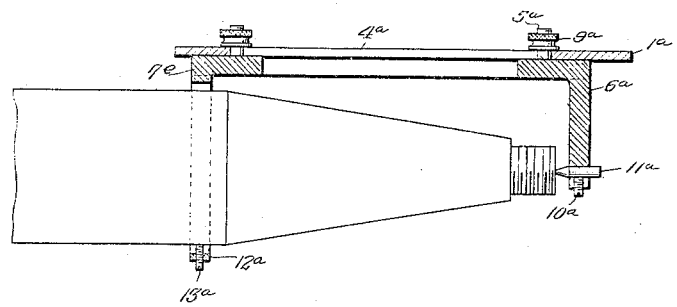
Figure 11:
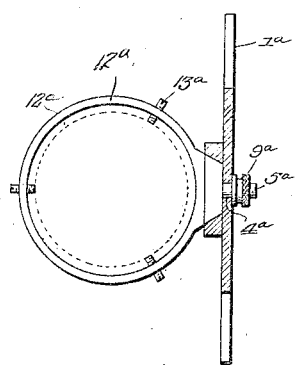

In Figures 9 to 11 I have illustrated a modification of my invention which is a material simplification.

In the modified construction, a body plate $1^a$ is provided with a graduated scale $7^x$ on its face and adjacent to its outer end, and said body plate is also provided with a wing $2^a$ on which is a graduated scale $8^a$. In the plate $1^a$ is a longitudinal slot $4^a$ to receive threaded shanks $5^a$ carried by a body having arms $6^a$ and $7^e$; the shanks $5^a$ being equipped with nuts $9^a$ as illustrated. Adjustably fixed by a set screw $10^a$ in arm $6^a$ is a centering pin $11^a$, and carried by the arm $7^e$ is a ring $12^a$ in which bear a plurality of equi-distant screws $13^a$ through the medium of which the ring may be set upon an axle or the like after the manner shown best in Figure 11. At $17^a$ is a jaw having a pointer $18^a$ designed to cooperate with the scale $8^a$. In the pointer is an aperture, and extending through said aperture and a slot in the body plate $1^a$ is the threaded shank of a screw 21, the said shank being designed to be received in a nut disposed back of the body plate and being, by preference, of the same construction as the shank 20, hereinbefore described, with reference to Figures 1 to 7.

The shaft is exactly centered in the link $12^a$ by centering the pin $11^a$ and adjusting the screws $13^a$.

It will be readily observed that the modified measuring device may be expeditiously and easily fixed in correct position relative to the tapered shaft or axle spindle, and that the jaw $17^a$ may then be expeditiously and easily positioned to indicate the angle of the conical handle or other shaft portion.

Having described my invention, what I claim and desire to secure by Letters Patent, is:—

1. A measuring device, comprising a body plate having wings and longitudinal slots therein, slotted plates bearing graduated scales and located flatwise on the wings, jaws disposed at right angles to the body plate and having portions connected to the body plate and also having pointers disposed parallel to the body plate adapted to cooperate with said graduated scales, and means for adjustably fixing the scale-bearing plates and the jaws with respect to the body plate.

2. A measuring device, comprising a body plate having slotted wings, slotted scale-bearing plates located flatwise on the wings, jaws having portions at angles to the body plate and portions connected to said plate and also having pointers parallel to the body plate and the scale-bearing plates, and means for permitting endwise movement of the scale-bearing plates, while preventing swinging movement thereof, and adjustably fixing the scale-bearing plates and the jaws with respect to the body plate.

3. A measuring device comprising a body plate, and an endwise movable transverse bolt extending through said body plate and removable therefrom, and having a head in which is a centering face, and means whereby said bolt may be moved endwise through the body plate without turning of the bolt about its axis.

4. A measuring device comprising a body plate having a sleeve at its back and also having wings and slots therein extending lengthwise of the wings, slotted plates bearing graduated scales and located flatwise on the wings, jaws disposed at right angles to the face of the body plate and having portions connected thereto and also having portions at angles to the body plate and pointers parallel to the body plate and adapted to cooperate with said graduated scales, means to adjustably fix the scale bearing plates and the jaws with respect to the body plate, an endwise movable transverse bolt extending through the said sleeve of the body plate and having a head in which is a centering face and also having a longitudinal groove, and a screw bearing in the sleeve and extending into the groove in the bolt.

In testimony whereof I affix my signature.

ANTOINE DESBAINS.